United States Patent

[11] 3,597,908

| [72] | Inventors | William A. Schaefer<br>Sparta;<br>Donald W. Zufelt, Casanovia; Donald<br>Grossman, Grant, all of, Mich. |
|---|---|---|
| [21] | Appl. No. | 787,522 |
| [22] | Filed | Dec. 27, 1968 |
| [45] | Patented | Aug. 10, 1971 |
| [73] | Assignee | Spar Jet Pruner, Inc.<br>Grant, Mich. |

[54] TREE-PRUNING APPARATUS
5 Claims, 6 Drawing Figs.

[52] U.S. Cl. .................................................. 56/233,
56/25, 216/620
[51] Int. Cl. ............................................. A01d 55/00
[50] Field of Search .......................................... 214/620;
56/233, 234, 235, 236, 25

[56] References Cited

UNITED STATES PATENTS

| 16,057 | 11/1856 | Hubbard | 56/297 |
|---|---|---|---|
| 2,291,987 | 8/1942 | Rogers | 56/25 |
| 2,304,421 | 12/1942 | Rogers | 56/25 |
| 2,588,002 | 3/1952 | Holmes | 56/25 |
| 2,664,690 | 12/1954 | Huddle et al. | 56/25 |
| 3,041,809 | 7/1962 | Anderson et al. | 56/25 |
| 3,091,072 | 5/1963 | Harrer | 56/25 |
| 3,203,162 | 8/1965 | Blaauw et al. | 56/297 |
| 3,396,862 | 8/1965 | Fischer | 214/620 |
| 3,410,431 | 11/1968 | Vik | 214/620 |
| 3,433,005 | 3/1969 | Deigaard | 56/235 |

FOREIGN PATENTS

| 391,898 | 5/1933 | Great Britain | 56/236 |
|---|---|---|---|
| 645,960 | 11/1950 | Great Britain | 56/233 |
| 897,431 | 5/1962 | Great Britain | 56/236 |

*Primary Examiner*—Russell R. Kinsey
*Attorney*—John E. McGarry

ABSTRACT: This disclosure relates to a tree-trimming cutter for trimming the branches of orchard trees, for example. the cutter has a longitudinal blade with reciprocating cutting teeth and is mounted on a forklift tractor which raises and lowers the cutter. An arm supports the blade for movement between upright and downwardly extending positions. The arm is laterally adjustable relative to the base so as to move the cutter out form the tractor as desired for cutting.

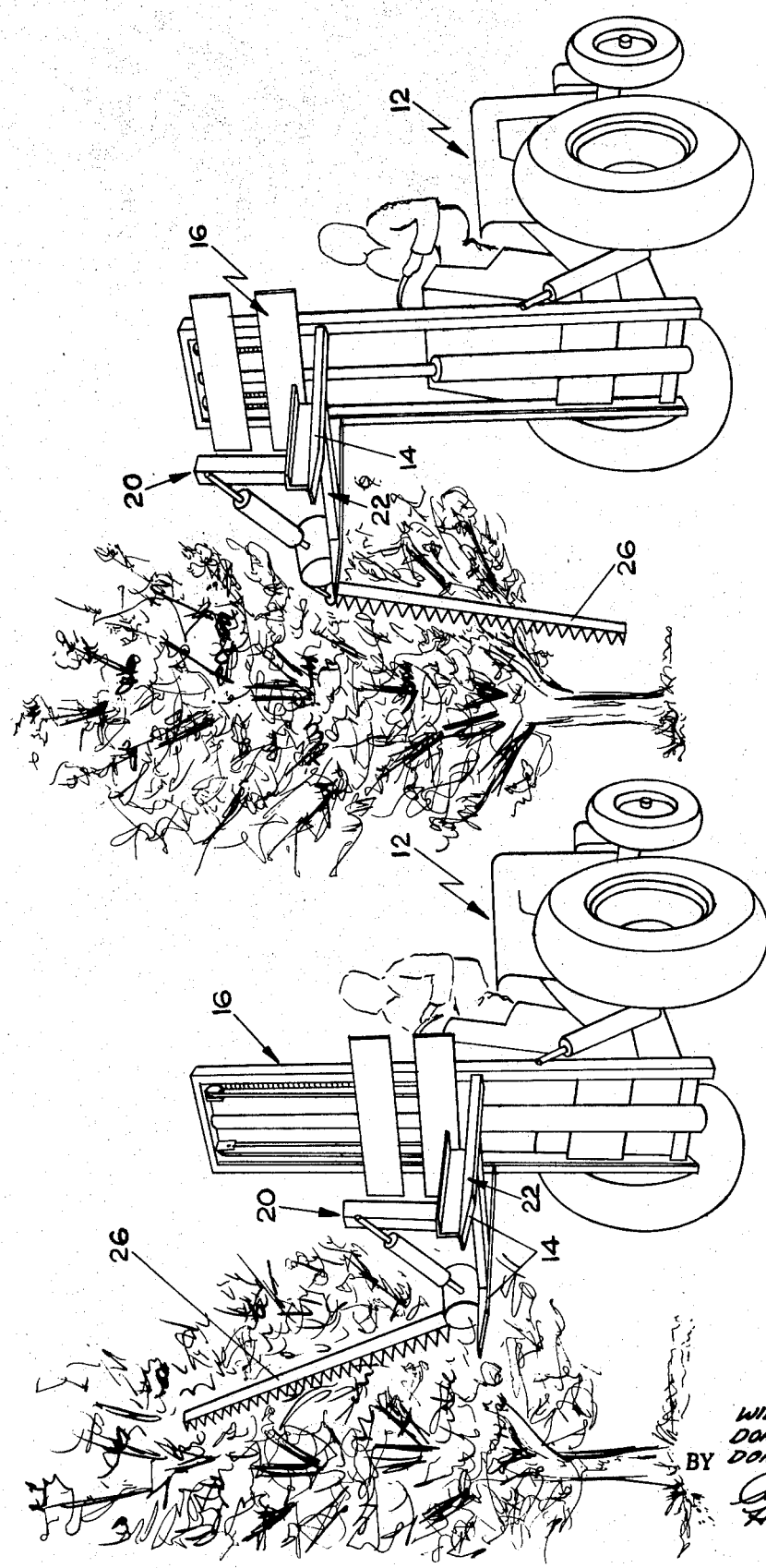

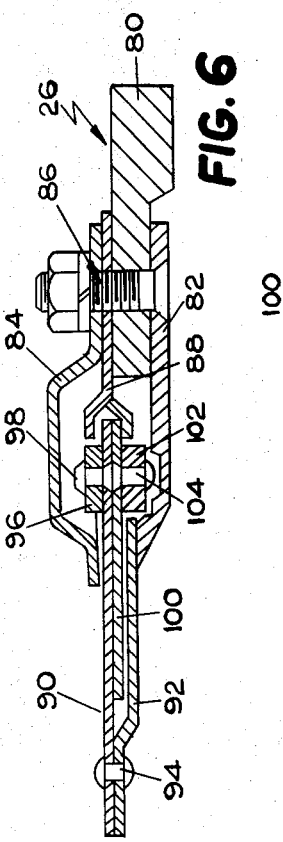
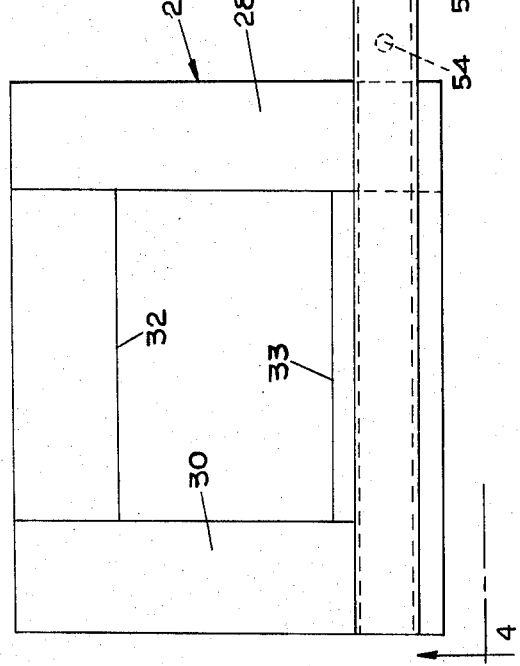
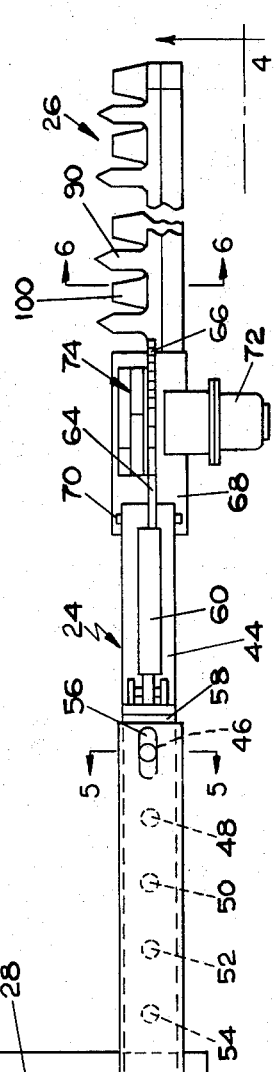
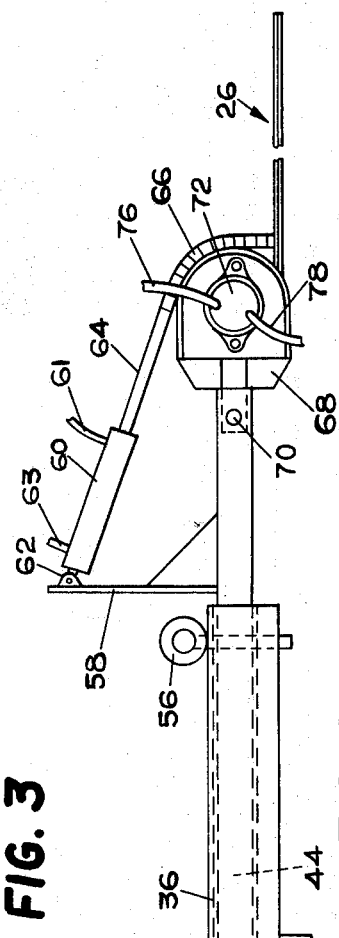
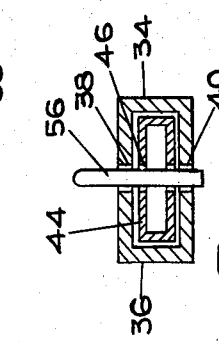

TREE-PRUNING APPARATUS

This invention relates to a tree-trimming cutter. In one of its aspects, it relates to a tree-trimming cutter adapted to be supported by a tractor and having a longitudinal cutting blade extending laterally of the tractor, which cutting blade is rotatable from an upright position to a downwardly extending position.

In another of its aspects, the invention relates to a tree-trimming cutter adapted to be supported by a forklift tractor and having a longitudinal cutting blade which is supported for lateral adjustment relative to the tractor.

The fruit growing industry has experienced harvesting and maintenance problems due to the scarcity and expense of labor. The industry has turned to mechanization to curb the increased cost.

Cutters have been devised for mechanized trimming of trees. However, the trimming apparatus have heretofore been complicated and too expensive for the smaller operators. We have now discovered a less expensive, compact and simplified tree-trimming apparatus which is adapted to be supported by a forklift tractor and has a cutting blade which is adjustable laterally of the tractor as well as rotatably supported for rotation between an upright position and a downwardly extending position.

By various aspects of this invention one or more of the following or other objects can be obtained.

It is an object of this invention to provide a simple and efficient tree-trimming cutter to be used especially in the trimming of fruit trees.

It is a further object of this invention to provide a tree-trimming cutter with a longitudinal cutting blade rotatably and laterally moveable to a plurality of positions relative to a support.

It is still a further object of this invention to provide a tree-trimming cutter having a longitudinal blade supported by a forklift tractor, which blade is positionable for vertical cutting so that branches cut will not fall onto the tractor operator.

Other aspects, objects, and the several advantages of this invention are apparent to one skilled in the art from a study of this disclosure, the drawings, and the appended claims.

According to the invention, there is provided a tree-trimming apparatus adapted to be carried by a tractor. The apparatus comprises a tractor engaging base, an arm fixed at its inner end to the base and extending laterally from the tractor engaging base, and longitudinal blade means rotatably supported on the arm for movement between an upright position and a downwardly extending position. The blade means includes a cutter blade and actuating means to drive the cutter blade. Means are also provided on the arm for actuating movement of the blade means between the upright position and the downwardly extending position.

In accordance with one embodiment of the invention, the arm is adjustably supported on the tractor-engaging base for lateral movement of the arm and the longitudinal blade means relative to the tractor-engaging base.

The invention will now be described with reference to the accompanying drawings in which:

FIG. 1 is a perspective view of a tree-trimming device according to the invention as mounted on a forklift tractor;

FIG. 2 is a view similar to FIG. 1 showing a second position of the tree-trimming device;

FIG. 3 is an enlarged top view of the device shown in FIG. 1 wherein the cutting blade is horizontal;

FIG. 4 is a view seen along lines 4–4 of FIG. 3;

FIG. 5 is an enlarged sectional view seen along lines 5–5 of FIG. 3; and

FIG. 6 is an enlarged sectional view of the blade taken along lines 6–6 of FIG. 3.

Referring now to the drawings, there is shown a forklift tractor 12 having a fork 14 supported by a lifting mechanism 16. A tree-trimming apparatus 20 is supported by the tractor forks and can be raised and lowered relative to the ground by the lifting mechanism 16.

The tree-trimming apparatus has a base 22, through which the apparatus 20 engages the fork 14. An arm 24 slideably engages the base and supports a cutting blade 26. The base 22 is a rigid rectangular structure formed from a pair of hollow open ended channel members 28 and 30 and cross members 32 and 33 which are welded to the hollow channel members 28 and 30. As illustrated in FIG. 4, the forks slide within conduits formed by the hollow channel members 28 and 30 and thereby engage the base 22 of the tree-trimming apparatus.

As illustrated in FIGS. 1 and 2, the blade 26 is rotatable between upright positions and downwardly extending positions relative to the supporting base 22.

The base further has a lateral slide formed by opposing channel members 34 and 36 which are welded to each other and welded to the top of the hollow channel members 28 and 30. A hole 38 and 40 is formed in the top and bottom respectively of the slide outer end.

The arm 24 comprises a hollow beam 44 which is rectangular in cross section having holes 46, 48, 50, 52 and 54 spaced laterally therealong. A pin 56 maintains the hollow beam 44 in a fixed relationship relative to the slide by extending through one of the holes in the beam and through the holes 38 and 40 in the slide.

An upstanding support member 58 extends upwardly from the end portion of hollow beam 44. A hydraulic cylinder 60 is pivotably mounted to the top of the support member at pin 62. Hoses 61 and 63 supply hydraulic fluid to either end of the hydraulic cylinder to actuate a piston rod 64. A chain 66 is fixed at one end to the outer end of piston rod 64 and at the other end to blade 26 to control the vertical movement of blade 26.

The blade 26 comprises a housing 68 which is pinned to the end of the hollow beam 44 at pin 70. The other end of the housing 68 is rounded to facilitate the sliding of a flexible chain 66 thereover. The flexible chain 66 is required to permit 180° rotation of the blade relative to the arm. A hydraulic motor 72 is fixed to the housing and has a drive shaft which actuates a blade drive mechanism 74. The motor is driven through hoses 76 and 78 from a suitable hydraulic fluid supply.

Referring now specifically to FIG. 6, the blade comprises a support beam 80, a bottom casing 82, a top casing 84 and a guide 88 secured together through a bolt 86. A top guard member 90 and a bottom guard member 92 are secured together at the outer end through a rivet 94. A bar 96 is secured to the top guard member 90 through rivet 98.

A blade 100 also slides within the guide 88 and has attached thereto a bar 102 through rivet 104.

Both the blade 100 and the guard formed by top guard member 90 and bottom guard member 92 reciprocate relative to each other. The guard is driven through a bar 96 and the blade 100 is driven through the bar 102. The drive mechanism 74 engages the bar 96 and the bar 102 to drive the members in opposite directions. The drive mechanism 74 and the blade are of conventional designs and can be purchased as a unit from Superior Equipment Company, 2917 South Cicero Avenue, Cicero, Illinois.

In operation, the tree-trimming apparatus 20 is mounted on the fork 14 of the forklift tractor 12 as illustrated in FIGS. 1 and 2. The blade is set to a desired position by actuating the hydraulic cylinder 60 to cause rotation of the housing about pin 70. The blade can go from a vertical position in which it extends downwardly from the arm 24 to a vertical position in which it extends upwardly from the arm 24. Thus, a 180° adjustment of the blade 26 is possible. The downwardly directed position of the blade is preferred. When the blade is vertically extending upwardly from the arm 24, the cuttings tend to fall in the way of the operator of the forklift tractor. However, when the blade is directed downwardly from the arm 24, then the cuttings will fall to the ground and will not strike the tractor operator. When the blade is properly set, the motor is started to vibrate the blade and guard. The tractor travels adjacent a row of trees. So long as the tractor travels in a straight line, all of the trees will be uniformly pruned.

As is obvious from the foregoing description, the tree-trimming apparatus can be used to trim vertically as well as horizontally. In other words the tree-trimming device can be used to trim the tops of the trees as well as the sides of the trees.

The slideably mounted arm 24 coupled with the large rotational variation of the blade 26 provides a versatile and simple trimming saw which can be used for a multitude of trimming operations. Since the saw can be mounted on a forklift tractor, the saw can be employed by a small orchard operator to replace hand trimming for a low capital investment.

The saw can also be used for cutting hedges and even mowing grass. The mounting of the saw on the forklift tractor permits horizontal cutting near ground level as well as horizontal cutting up to about 20 feet above ground level.

Reasonable variation and modification are possible within the scope of the foregoing disclosure and drawings without departing from the spirit of the invention.

The embodiments of an invention in which we claim an exclusive property or privilege are defined as follows:

1. A tree-trimming apparatus adapted to be carried by a forklift, said apparatus comprising:
   a base comprising a rigid structure having open ended support channel means adapted to receive the forks of a forklift;
   elongated cutter means extending from said base in a direction generally normal to said support channel means and pivotally supported on said base for movement between an upright position and a downwardly extending position; actuating means for said cutter means supported by said base; and
   means connected between said base and said cutter means for actuating said blade means for movement between said upright position and said downwardly extending position.

2. A tree-trimming apparatus according to claim 1 wherein said cutter means is pivotally mounted on an arm extending in a direction normal to said support channels and said arm is mounted for lateral adjustment in said direction on said base, and means are provided to secure said arm in a plurality of lateral positions relative to said base.

3. An apparatus according to claim 1 wherein said cutter means comprises first and second reciprocating members, said first reciprocating member driving a plurality of forwardly projecting blade teeth, and said second reciprocating member driving a plurality of forwardly projecting guard teeth which are synchronized to move in opposite directions to said blade teeth.

4. A tree-trimming apparatus according to claim 1 wherein said longitudinal blade means is pivotable through an arc of about 180° from a vertically upright position to a vertically downward position relative to said arm.

5. A tree-trimming apparatus according to claim 1 wherein said means for actuating movement of said blade means comprises a fluid cylinder pivotably mounted at one end to said tractor-engaging base, a piston rod extending from said power cylinder and actuated thereby, and a flexible coupling member between said cutter means and the end of said piston rod.